UNITED STATES PATENT OFFICE.

PAUL JULIUS AND CARL IMMERHEISER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

AZO DYE.

1,073,902.  Specification of Letters Patent.  Patented Sept. 23, 1913.

No Drawing.  Application filed May 28, 1913.  Serial No. 770,328.

*To all whom it may concern:*

Be it known that we, PAUL JULIUS and CARL IMMERHEISER, citizens, respectively, of the Austro-Hungarian Empire and of the German Empire, residing at Ludwigshafen-on-the-Rhine, Germany, have invented new and useful Improvements in Azo Dyes, of which the following is a specification.

We have discovered a new coloring matter which can be produced by combining diazotized meta-toluidin with benzoyl-1.8-amino-naphthol-4.6-disulfonic acid, and which is very valuable in the form of its lakes.

One of the characteristics of our new coloring matter is that on gentle reduction with stannous chlorid and hydrochloric acid, it gives rise to meta-toluidin and an amino compound of benzoyl-1.8-amino-naphthol-4.6-disulfonic acid.

The following example will serve to illustrate further the nature of our invention, which, however, is not confined to this example. The parts are by weight. Diazotize 107 parts of meta-toluidin (which may be done in the usual manner) and run the solution, while stirring, into a solution of 467 parts of the disodium salt of benzoyl-1.8-amino-naphthol-4.6-disulfonic acid, to which an excess of sodium carbonate has been added. When the combination is complete, heat the mass to about 80° C., add common salt, if necessary, and then filter off and press and dry the coloring matter. It is a violet-red powder which dissolves in water, the solution being brilliant red. In the form of its alkaline earth lakes, it possesses brilliant blue-red shades. The conversion into lakes can be effected in any manner usually employed for converting coloring matters into lakes and can be carried out, if desired, without any intermediate isolation of the coloring matter.

Now what we claim is:—

The new azo coloring matter which can be produced by combining diazotized meta-toluidin with benzoyl-1.8-amino-naphthol-4.6-disulfonic acid, which coloring matter consists when dry of a violet-red powder which yields a brilliant red solution in water and in the form of its alkaline earth lakes possesses brilliant blue-red shades, and which upon gentle reduction with stannous chlorid and hydrochloric acid gives rise to meta-toluidin and an amino derivative of benzoyl-1.8-amino-naphthol-4.6-disulfonic acid.

In testimony whereof we have hereunto set our hands in the presence of two subscribing witnesses.

PAUL JULIUS.
CARL IMMERHEISER.

Witnesses:
J. ALEC. LLOYD,
JOSEPH PFEIFFER.